(12) United States Patent
Filsinger et al.

(10) Patent No.: US 11,742,104 B2
(45) Date of Patent: Aug. 29, 2023

(54) ADJUSTED SEGMENTED COLLIMATOR COMPRISING A SOLLER SLIT

(71) Applicant: Bruker AXS GmbH, Karlsruhe (DE)

(72) Inventors: Frank Filsinger, Karlsruhe (DE); Gerhard Hammerschmid, Karlsruhe (DE)

(*) Notice: Subject to any disclaimer, the term of this patent is extended or adjusted under 35 U.S.C. 154(b) by 0 days.

(21) Appl. No.: 17/667,822

(22) Filed: Feb. 9, 2022

(65) Prior Publication Data

US 2022/0254535 A1 Aug. 11, 2022

(30) Foreign Application Priority Data

Feb. 9, 2021 (DE) .................. 10 2021 103 037.4

(51) Int. Cl.
*G21K 1/04* (2006.01)
*G01N 23/20* (2018.01)
*G21K 1/02* (2006.01)

(52) U.S. Cl.
CPC ............ *G21K 1/043* (2013.01); *G01N 23/20* (2013.01); *G21K 1/02* (2013.01); *G21K 1/04* (2013.01); *G21K 1/046* (2013.01); *G01N 2223/05* (2013.01)

(58) Field of Classification Search
CPC ............ G21K 1/02; G21K 1/04; G21K 1/043; G21K 1/025; A61B 6/06; A61N 5/1042; A61N 5/1045; A61N 5/1047
USPC ........................................... 378/65, 147–153
See application file for complete search history.

(56) References Cited

U.S. PATENT DOCUMENTS

| 2,138,555 | A | | 11/1938 | Otvos |
| 4,419,763 | A | | 12/1983 | Hawman |
| 4,856,043 | A | * | 8/1989 | Zola .................. G21K 1/02 |
| | | | | 976/DIG. 428 |

(Continued)

FOREIGN PATENT DOCUMENTS

| DE | 10242260 A1 | 3/2004 |
| DE | 69923084 T2 | 12/2005 |

(Continued)

OTHER PUBLICATIONS

An English translation of JP2007292615A by Patent Translate. (Year: 2023).*

(Continued)

*Primary Examiner* — Allen C. Ho
(74) *Attorney, Agent, or Firm* — BENOIT & COTE, INC.

(57) ABSTRACT

A collimator assembly for an x-ray optical system having a Soller slit for collimation of x-ray radiation with respect to a direction of an axis (z) of the Soller slit, wherein the Soller slit has a plurality of lamellae spaced apart from one another and having lamella planes parallel to one another, is characterized in that the Soller slit comprises a plurality of segments which are arranged along the axis and are separated from one another. The arrangement also has a collimator frame for enclosing and guiding the plurality of segments, and at least one of the plurality of segments is displaceable with respect to the collimator frame and relative to other segments. A simple but nonetheless accurate adjustment of the spectral resolution of an x-ray spectrometer to a respective different analytical application is thus enabled in a compact and cost-effective manner.

15 Claims, 5 Drawing Sheets

(56) References Cited

U.S. PATENT DOCUMENTS

| | | | | |
|---|---|---|---|---|
| 5,016,267 | A * | 5/1991 | Wilkins | G21K 1/00 378/150 |
| 5,408,512 | A * | 4/1995 | Kuwabara | G01N 23/2076 378/45 |
| 5,771,270 | A | 6/1998 | Archer | |
| 6,188,748 | B1 * | 2/2001 | Pastyr | G21K 1/04 378/65 |
| 6,266,392 | B1 * | 7/2001 | Fujinawa | G21K 1/06 378/147 |
| 6,307,917 | B1 * | 10/2001 | Shimizu | G21K 1/025 378/147 |
| 6,444,993 | B1 | 9/2002 | Kogan | |
| 6,464,835 | B1 | 10/2002 | Raeisaenen et al. | |
| 6,526,123 | B2 * | 2/2003 | Ein-Gal | G21K 1/04 378/65 |
| 6,908,513 | B2 | 6/2005 | Henke | |
| 7,127,037 | B2 * | 10/2006 | Bowen | G21K 1/025 378/71 |
| 7,983,389 | B2 | 7/2011 | Ollinger | |
| 8,139,717 | B2 * | 3/2012 | Harding | G21K 1/025 378/147 |
| 8,162,585 | B2 | 4/2012 | Tsujimoto et al. | |
| 8,718,234 | B2 * | 5/2014 | Echner | G21K 1/046 378/152 |
| 9,031,192 | B2 * | 5/2015 | Zhao | G01N 23/20 378/87 |
| 10,794,845 | B2 | 10/2020 | Filsinger et al. | |
| 10,900,912 | B2 * | 1/2021 | Beckers | G01N 23/20008 |
| 10,964,439 | B2 * | 3/2021 | Pina | G21K 1/06 |
| 2011/0081004 | A1 | 4/2011 | Harding et al. | |
| 2011/0163235 | A1 | 7/2011 | Soluri et al. | |
| 2019/0317029 | A1 | 10/2019 | Beckers et al. | |

FOREIGN PATENT DOCUMENTS

| | | |
|---|---|---|
| DE | 202008018512 U1 | 10/2014 |
| DE | 10 2017 223 228 B3 | 12/2018 |
| DE | 3 00 122 A1 | 11/2019 |
| EP | 2 194 375 B1 | 1/2018 |
| JP | H6308293 A | 11/1994 |
| JP | H11304728 A | 11/1999 |
| JP | 2000329711 A | 11/2000 |
| JP | 3415328 B2 | 6/2003 |
| JP | 2005172477 A | 6/2005 |
| JP | 2006141910 A | 6/2006 |
| JP | 2007292615 | 11/2007 |
| WO | 2018220053 A1 | 12/2018 |

OTHER PUBLICATIONS

Bruker S8 Tiger; https://www.bruker.com/en/products-and-solutions/elemental-analyzers/xrf-spectrometers/s8-tiger.html [retrieved: Feb. 8, 2022].

Rigaku ZSX Primus IV; https://www.youtube.com/watch?v=rufCvmeZMvU [Sep. 21, 2016].

Harpreet Singh Kainth, "Chemical shift in $L\alpha$, $L\beta 1$, $L\beta 3,4$, $L\beta 2, 15$, $L\gamma 1$ and $L\gamma 2,3$ emission lines of 47Ag, 48Cd and 50Sn compounds", Nuclear Inst. and Methods in Physics Research B, 414 (2018) pp. 84-98.

Wikipedia, "Gammakamera", URL:https://de.wikipedia.org/w/index.php?title=Gammakamera&oldid=192502542 [gefunden am May 11, 2022], Sep. 23, 2019.

Wikipedia, Gamma Camera, URL:https://en.wikipedia.org/wiki/Gamma_camera [retrieved on Jun. 1, 2022], Feb. 26, 2022.

"Gammakamera—Wikipedia", Sep. 23, 2019 (Sep. 23, 2019), https://de wikipedia.org/w/index.php?title=Gammakamera&oldid=192502542 [accessed May 11, 2022].

* cited by examiner

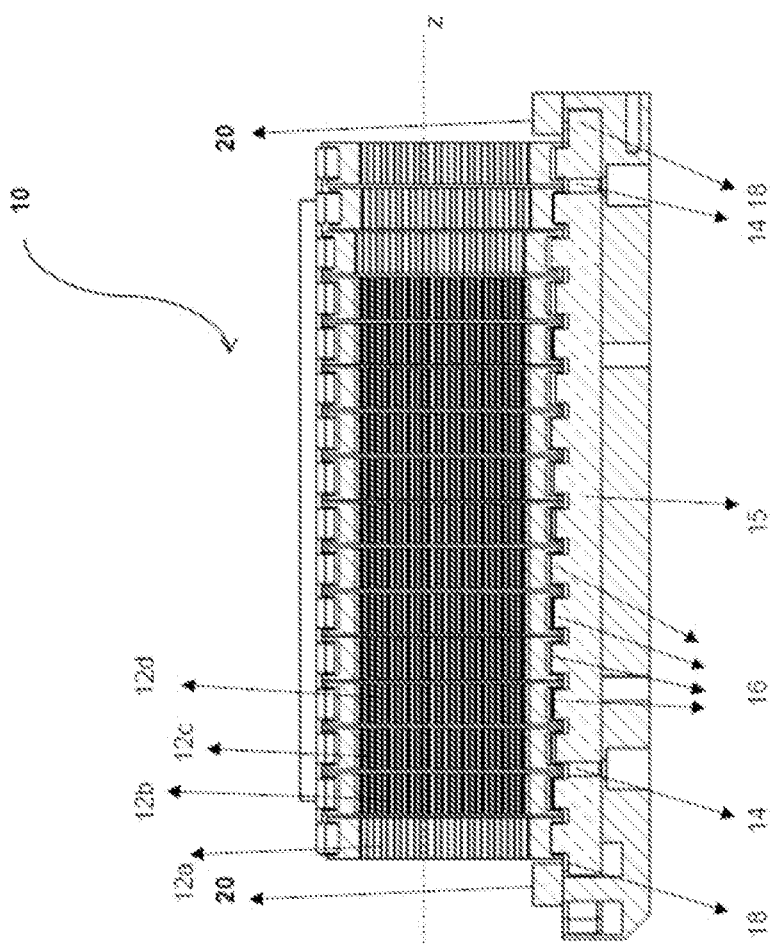
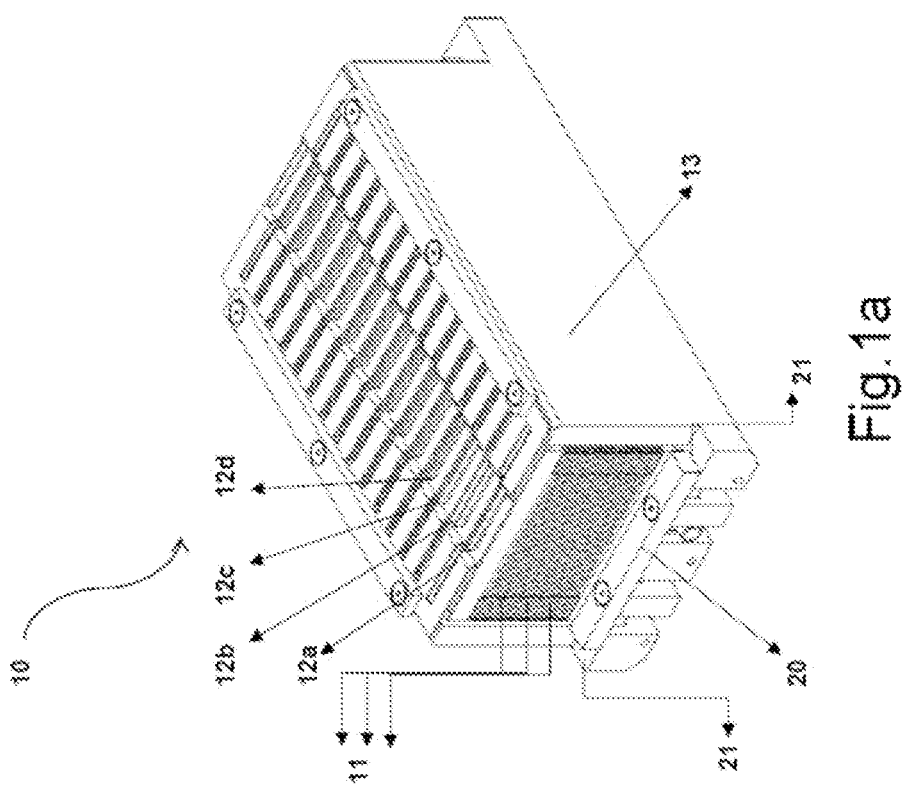
Fig.1b
Fig.1a

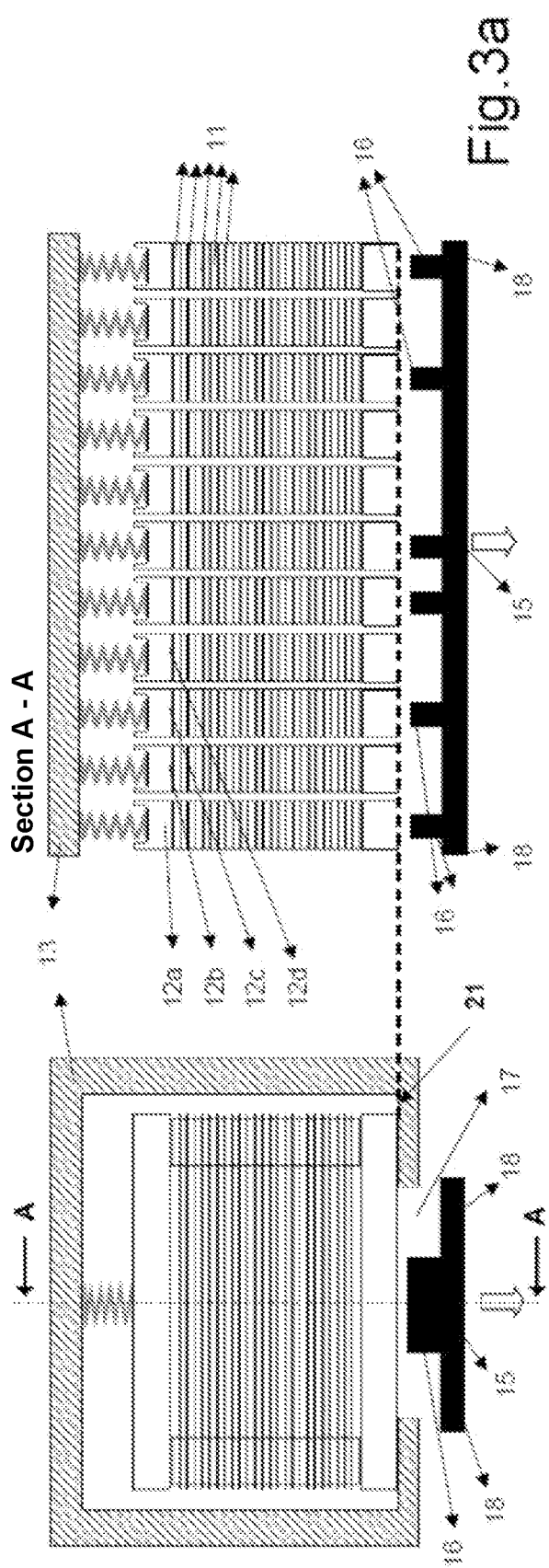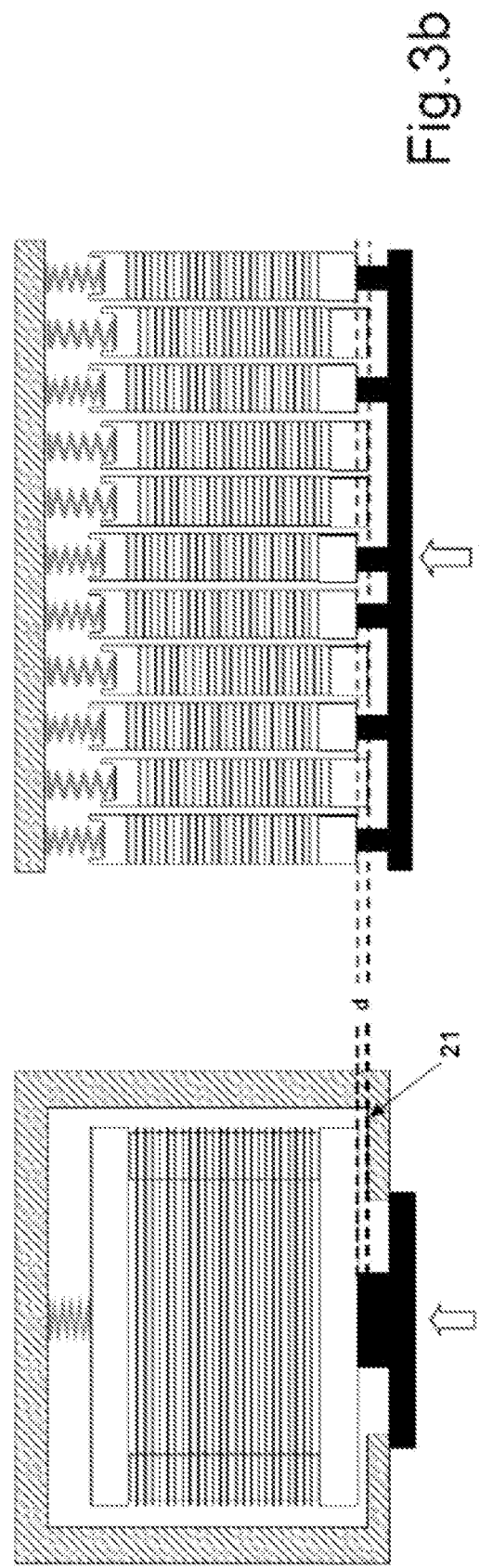

ADJUSTED SEGMENTED COLLIMATOR COMPRISING A SOLLER SLIT

BACKGROUND OF THE INVENTION

Field of the Invention

The invention relates to a collimator assembly for an x-ray optical system having a Soller slit for collimating x-ray radiation with respect to the direction of an axis of the Soller slit, wherein the Soller slit has a plurality of lamellae spaced apart from one another having lamella planes parallel to one another. Such a collimator assembly is known from EP 2 194 375 B1.

Description of the Related Art

X-ray measurements, in particular x-ray spectrometry and x-ray diffractometry, are used for qualitative and quantitative chemical analysis and for structural analysis of samples in various areas of application. Depending on the stated analytical problem, a different angular resolution of the setup is necessary and a rapid change between measurements having different angular resolutions is desirable.

In conventional x-ray spectrometers for x-ray fluorescence analysis, the angular resolution is normally set via primary collimators, which are usually embodied as a Soller slit. Such a collimator having parallel lamella arrangement is already described in DE 30 00 122 A1. In general, multiple collimators having different lamella spacing are installed. Depending on the analytical requirement, a suitable collimator having a motorized drive is placed in the beam path to set the required angular resolution and thus adjust the spectral resolution of the device to the analytical task.

From US 2011/0081004 A1 a FASC (fixed angle secondary collimator) arrangement with a base plate is known, comprising slots for the fixed accommodation of similar plates. Each plate thereby comprises partition walls and slots through which the X-rays can pass.

DE 10 2017 223 228 B3 describes an X-ray spectrometer with a modified nominal aperture, in which the lamellae form a plurality of slit-shaped passages, wherein partitions aligned perpendicular to the slits are present in a part of the slits formed by the lamellae, which partitions are opaque to X-rays and prevent the transverse divergence of the X-rays passing through the collimator arrangement.

X-rays passing through the collimator arrangement in a direction transverse to the diffraction plane of the X-rays coming from the sample. This allows significantly faster spatially resolved measurements to be made.

Assembly having Multiple Collimators

In the x-ray spectrometer "Bruker S8 TIGER" (produced by Bruker AXS, GmbH, Karlsruhe, Germany), in which collimators embodied as a Soller slit are used, this object is implemented using a collimator changer, in which four different collimators are arranged in a drum. One of the collimators at a time can be alternately rotated into the beam path with the aid of a motorized drive.

In the x-ray spectrometer "Rigaku ZSX Primus IV" (produced by Rigaku Corporation, Tokyo, Japan), three collimators are arranged adjacent to one another, which can be positioned alternately in the beam path via a linear displacement mechanism.

Large Space Requirement

To optimize the efficiency of the x-ray spectrometer, the beam path has to be embodied as compactly as possible. In addition, multiple lines of sight on the sample are to be housed in modern x-ray spectrometers. This is made significantly more difficult by the large structural volume of a conventional collimator changer.

High Costs and High Material Use

Soller slits are constructed from individual plates (lamellae). A typical Soller slit consists of 40 to 100 lamellae, which are compressed or adhesively bonded with spacers. The angular resolution of the collimator can be adapted via the spacing of the lamellae and the length of the Soller slit. The assembly process is usually complex and expensive. The smaller the lamella spacing, the more expensive is the production, since significantly more material is required. One separate collimator has to be manufactured and installed in the spectrometer per set angular resolution. Therefore, high costs due to a higher material use are linked to conventional solutions.

Instead of installing multiple collimators and shifting them alternately into the beam path, a tiltable collimator was presented in JP 6308293 A.

However, it is disadvantageous here that the cross-sectional area and thus the field of view on the sample changes with the tilt. The usable height becomes smaller in the same ratio with smaller lamella spacing (and therefore better resolution).

A variable Soller slit is presented in U.S. Pat. No. 6,444,993 B1, in which the lamella spacing remains constant and the adjustment of the resolution is implemented via a variable length of the Soller slit along the beam direction.

On the one hand, the large space requirement around the beam path is disadvantageous in the arrangement according to U.S. Pat. No. 6,444,993 B1. Typical sample diameters in an XRF spectrometer are ~4 cm. The beam path has to cover a representative part of the surface and typically has a cross-sectional area of ~6 cm$^2$. The Soller slit outlined in U.S. Pat. No. 6,444,993 B1 requires significantly more space perpendicular to the propagation direction than the actual cross-sectional area of the beam path. On the other hand, it is disadvantageous that the angular resolution of the Soller slit (the length along the beam direction here) changes over the cross-sectional area of the beam path. The angular resolution is therefore different for various regions of the sample, which makes the evaluation of the analytical results significantly more difficult.

A generic x-ray optical element with respect to the present invention having a Soller slit is known from EP 2 194 375 B1, which comprises multiple lamellae spaced apart from one another having lamella planes parallel to one another for collimating an x-ray beam with respect to the direction of the axis of the Soller slit. The above-described problem of a simple adjustment of the spectral resolution of the x-ray spectrometer to different analytical applications remains.

SUMMARY OF THE INVENTION

The present invention uses a modified collimator assembly having a Soller slit of the type described above, by means of which a simple, but nonetheless accurate adjustment of the spectral resolution of an x-ray spectrometer to a respective different analytical requirement is enabled in a compact and cost-effective manner.

This is achieved by the present invention in a manner which is surprisingly simple and effective in that the Soller slit comprises a plurality of segments arranged along the axis and separated from one another, in that the collimator assembly has a collimator frame for surrounding and guiding the segments, and in that at least one of the segments is displaceable with respect to the collimator frame and with respect to other segments of the Soller slit.

The object according to the invention is thus achieved by a segmented collimator, wherein one or more segments of the collimator can be displaced—generally perpendicularly—with respect to the lamellae. If half the segments are displaced by half a lamella spacing, the angular resolution thus improves by approximately a factor of two. If one-third of the segments are displaced by approximately ⅓ of the lamella spacing and one-third of the segments are displaced by approximately ⅔ of the lamella spacing, the angular resolution thus improves by approximately a factor of three. The basic concept of the invention is based on the finding that the lamellae do not necessarily have to be continuous along the beam direction for the functionality of a collimator. There only cannot be any lines of sight through the collimator, in which the entry into the collimator and the exit from the collimator takes place between different lamellae.

The x-ray optical system, in which the collimator assembly according to the invention is used, is equipped with an x-ray source from which x-ray radiation is guided as a primary beam onto a sample to be studied, having an x-ray detector for receiving x-ray radiation diffracted or scattered at the sample, wherein the collimator assembly and a dispersive element (e.g., a crystal or a grating) for the spectral analysis of the x-ray radiation are provided between the sample and the x-ray detector.

There are a number of advantages of the collimator assembly according to the invention in relation to the prior art, including the following:

1. The invention has a compact construction. In the installation space which corresponds to a collimator having fixed angular resolution, multiple different angular resolutions can be implemented. A displacement by only a fraction of the lamella spacing is required (<1 mm).

2. The system is of a cost-effective and material-saving construction. Up to this point, costs and material use have increased more the better the angular resolution of a collimator is to be. More individual plates are required for finer collimators. In the approach according to the invention, the material used for all implemented angular resolutions corresponds to the coarsest (and thus most cost-effective) collimator.

3. The cross-sectional area and the visible region on the sample remain constant in all settings of the segments.

4. The angular resolution over the entire cross-sectional area of the beam path is constant.

A class of embodiments of the collimator assembly according to the invention which is particularly advantageous in practice is distinguished in that the Soller slit has at least three, preferably more than three, segments, wherein at least one, in particular several, of the segments is/are each displaceably arranged along its segment direction or their segment directions, respectively, perpendicularly to the lamella plane relative to the collimator frame.

One particular refinement of this class of embodiments is characterized in that the segment directions of all segments of the Soller slit are oriented identically, or that the segment directions of some segments are arranged rotated by 90° with respect to the segment directions of other segments. With identical orientation of the segment directions, the spectral resolution may be adjusted more finely. With an arrangement of some segments rotated by 90°, a variable location coding of the transmitted x-ray beams can be achieved upon displacement of the segments, in that the spatial divergence is restricted perpendicularly to the diffraction direction and thus a higher position resolution is achieved.

In other refinements of this collimator assembly, the segments each have the same external dimensions in the segment direction. This enables a compact and uniform structural form.

Embodiments of the collimator assembly according to the invention are also presented herein, in which the segments each have the same external dimensions in the direction of the axis of the Soller slit. In this way, a uniform mode of operation of the segments is achieved. The same displacement of equivalent segments has the same effect.

In further advantageous embodiments, the lamellae each have the same spacing from one another in each segment of the Soller slit. A uniform mode of operation of the segments is also achieved in this way.

Embodiments of the invention are also advantageous which are distinguished in that the displaceable segments are coupled to actuators—which are in particular electromechanical, electromagnetic, or pneumatic—which can cause the displacement of the segments. A manual adjustment is also conceivable. The automated change of the action of the collimator assembly is possible by actuators.

A class of embodiments of the collimator assembly according to the invention is also preferred in which the displaceably arranged segments of the Soller slit are each spring mounted relative to the collimator frame along a segment direction perpendicular to the lamella plane. A spring mounting of the displaceably arranged segments ensures that they are in a well-defined position at all times in the collimator frame.

These embodiments can be improved in refinements in that the spring-mounted segments of the Soller slit are arranged in a base position in such a way that they are pressed with their respective segment base against the collimator frame. A uniform base position of the displaceably mounted segments is achieved by the uniform arrangement of the suspensions. Moreover, the construction of the collimator assembly is simplified, since the segments including the suspensions are constructed identically.

In particularly advantageous variants, the collimator assembly comprises at least one stamp element having at least one tappet, which contacts the segment base of one or more displaceable segments through an opening of the collimator frame and can displace them out of the base position into a set position, in particular in such a way that a predefined set pattern of the segments is achieved. An engagement through the collimator frame is achieved by tappets, so that the segments can be adjusted from outside the collimator frame. If multiple segments are combined with one tappet, a predefined coding of a set pattern of the segments may moreover be achieved.

These variants of the collimator assembly according to the invention can also be further improved in that each stamp element has a collar, which is pressed against the edge of the opening of the collimator frame for accurate positioning of the segments in the set position. It is ensured in this way that no stamp element is pushed too far into the collimator frame. The collar represents an end stop for the stamp element and reduces the precision requirements for the actuator of the adjustment mechanism.

Alternatively or additionally, each stamp element can comprise multiple tappets, wherein the tappets have different heights in the segment direction for different positioning of the displaceable segments. By assigning multiple tappets to one stamp element, a simplified adjustment of the segments can be achieved, since only one stamp element has to be moved for the movement of multiple segments. If the tappets have different heights, a differentiated set pattern of the segments can be achieved in this way.

Further variants are characterized in that the collimator assembly comprises multiple stamp elements, which can be moved independently of one another, wherein in particular different set patterns of the segments can be achieved with the introduction of the stamp elements into the contact pressure position. In this way, the set patterns disclosed herein can be set selectively and more than two configurations of different resolution can be implemented.

Variants of the collimator assembly according to the invention having pneumatic actuation are also advantageous, which are distinguished in that the collimator frame comprises a receptacle for a flexible hose below a stamp element, which can expand due to application of a gas pressure and can displace the stamp element from the base position into the set position. The use of a pneumatic actuation avoids introduction of electrical elements into the collimator assembly, which are possibly susceptible to failure and would also be expensive. Moreover, such a pneumatic drive mechanism hardly releases heat, which is important for the temperature stability of an x-ray spectrometer.

Finally, a variant of the collimator assembly according to the invention is also preferred in which adjacent segments which are jointly displaceable by an equal distance d by a stamp element or are made non-displaceable are each combined into a segment group. The production of the collimator assembly according to the invention is more cost-effective due to the combination of segments to form segment groups.

Further advantages of the invention are also disclosed herein. The above-mentioned features and the features set forth below can be used individually as such or in groups in arbitrary combinations according to the invention. The embodiments shown and described are not to be understood as an exhaustive list, but rather have exemplary character for the description of the invention.

BRIEF DESCRIPTION OF THE DRAWINGS

The invention is illustrated in the drawing and will be explained in more detail on the basis of exemplary embodiments. In the figures:

FIG. 1a shows a three-dimensional illustration of an embodiment of the collimator assembly according to the invention in a top view diagonally from above;

FIG. 1b shows a vertical section through the embodiment according to FIG. 1a;

FIG. 3a shows a schematic vertical section through an embodiment of the collimator assembly according to the invention in non-displaced starting position of the segments, with a frontal view in the direction of the z axis being shown to the left side of the figure and a side view along the line of section A-A in parallel to the z axis being shown along to the right side of the figure;

FIG. 3b shows an embodiment like FIG. 3a, but in a set pattern having displaced segments;

FIG. 5b shows an embodiment like FIG. 1a; and

DETAILED DESCRIPTION

Figure 2:
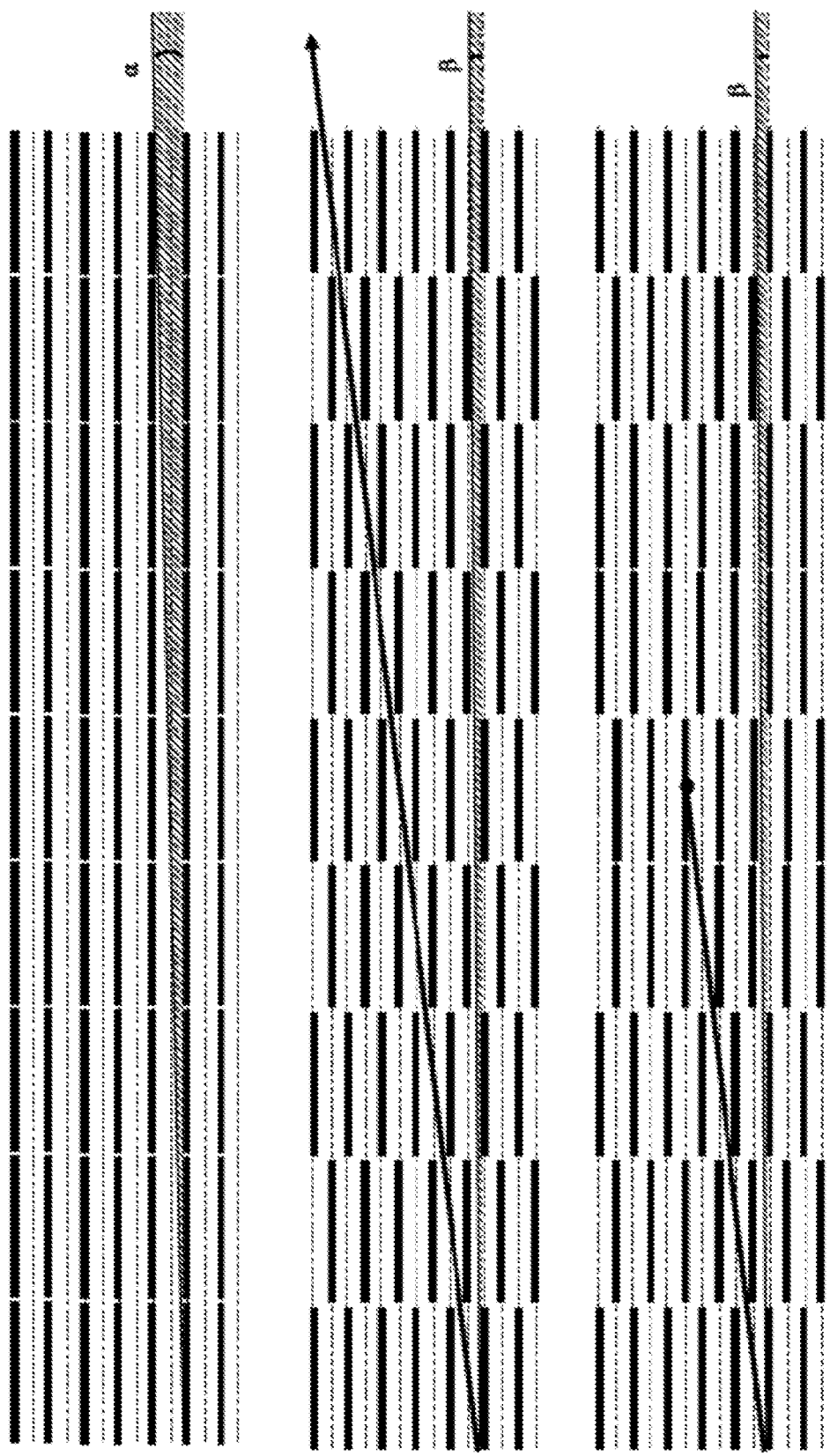
FIG. 2 shows a schematic vertical section through a collimator assembly according to the invention in three different set patterns: a non-displaced starting position (coarse resolution), every second segment uniformly displaced, and with asymmetry in the sequence of displaced and non-displaced segments.

FIGS. 1a to 5c of the drawings show, in more or less schematic views of differing detail, various embodiments of a collimator assembly 10 according to the invention. This is a component of an x-ray optical system—not shown in greater detail in the drawings—having a Soller slit for collimation of x-ray radiation with respect to the direction of an axis z of the Soller slit in parallel to the propagation direction of the x-ray radiation, wherein the Soller slit has a plurality of lamellae 11 spaced apart from one another having lamella planes parallel to one another.

The collimator assembly 10 according to the invention is distinguished in that the Soller slit comprises a plurality of segments 12a, 12b, 12c, 12d, . . . which are arranged along the axis z and separated from one another. The collimator assembly 10 has a collimator frame 13 to enclose and guide the plurality of segments 12a, 12b, 12c, 12d, . . . . At least one, but generally several of the segments 12a, 12b, 12c, 12d, . . . are displaceable with respect to the collimator frame 13 and relative to other segments of the Soller slit, preferably along their segment directions perpendicular to the lamella plane relative to the collimator frame 13.

In the embodiments of the collimator assembly 10 according to the invention illustrated in the drawings, the segment directions of all segments 12a, 12b, 12c, 12d, . . . of the Soller slit are oriented identically.

Moreover, the plurality of segments 12a, 12b, 12c, 12d, . . . in the embodiments of the drawings each have the same external dimensions in the segment direction and also in the direction of the z axis of the Soller slit and the lamellae 11 in each segment 12a, 12b, 12c, 12d, . . . of the Soller slit each have the same spacing from one another. In embodiments which are not shown separately in the drawings, however, segments of different widths can also be used, for example, in that adjacent segments which are jointly displaced or not displaced are combined. Moreover, non-displaced elements can also be permanently fixed on the collimator frame 13.

The plurality of segments 12a, 12b, 12c, 12d, . . . of the Soller slit can be produced, for example, by means of additive manufacturing methods—such as 3D printing—or by trimming—for example wire eroding—of a conventional adhesively bonded collimator. The latter permits a cost-effective and force-free processing and is advantageous with respect to the manufacturing tolerances, since all segments are produced from one starting component.

The displaceable segments 12a, 12b, 12c, 12d, . . . can be coupled to electromechanical, electromagnetic, or pneumatic actuators 14, which effectuate the displacement of the segments 12a, 12b, 12c, 12d, . . . . Hose parts 14' of a pneumatic actuator 14 are shown in particular in FIGS. 4a to 5a.

As shown in the embodiments of FIGS. 3a to 4b, the displaceably arranged segments 12a, 12b, 12c, 12d, . . . of the Soller slit can each be spring mounted along a segment direction perpendicular to the lamella plane relative to the collimator frame 13 and can be arranged in a base position in such a way that they are pressed with their respective segment base against the collimator frame 13.

The collimator assembly 10 according to the invention can—as is apparent from FIGS. 1b and 3a to 5a—comprise at least one stamp element 15; 15'; 15" having at least one tappet 16, which can contact the segment base of one or more displaceable segments 12a, 12b, 12c, 12d, . . . through an opening 17 of the collimator frame 13 and can displace them from the base position into a set position, in particular in such a way that a predefined set pattern of the segments 12a, 12b, 12c, 12d, . . . is achieved, for example, as shown in FIG. 2.

In particular FIGS. 1b and 3a to 4b show stamp elements 15, which each have a collar 18, which can strike against the edge of the opening 17 of the collimator frame 13 for the accurate positioning of the segments 12a, 12b, 12c, 12d, . . . in the set position.

Each stamp element 15; 15'; 15" can comprise multiple tappets 16, which can have various heights in the segment direction for different positioning of the displaceable segments 12a, 12b, 12c, 12d, . . . . The stamp elements 15; 15'; 15" can be moved independently of one another, wherein in particular different set patterns of the segments 12a, 12b, 12c, 12d, . . . are enabled with the introduction of the stamp elements into the contact pressure position.

As can be seen well in particular in FIG. 5c, the collimator frame 13 can comprise a receptacle 19 below a stamp element 15 for a flexible hose 14' (see FIGS. 4a to 5a), which can expand due to application of a gas pressure and can displace the corresponding stamp element 15 from the base position into the set position.

Adjacent segments 12a, 12b, 12c, 12d, . . . which are made jointly displaceable by an equal distance d by a stamp element 15 or non-displaceable can each be combined into a segment group.

Figure 5C:
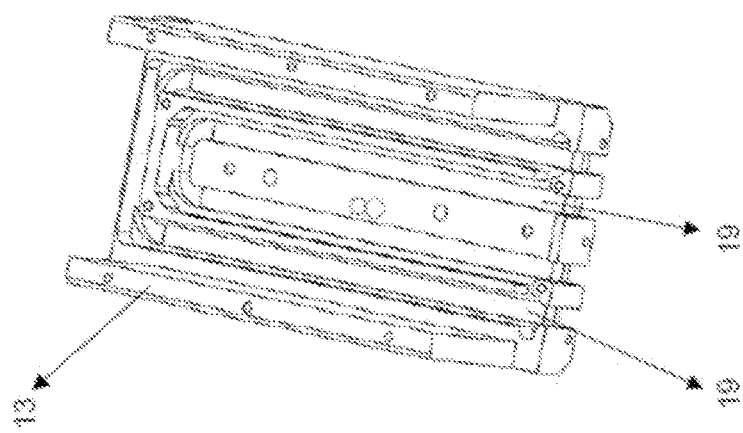
FIG. 5c shows a three-dimensional illustration of a collimator frame having milled recesses for hoses of a pneumatic actuator for a collimator assembly according to the invention in a top view from above.
Figure 5B:
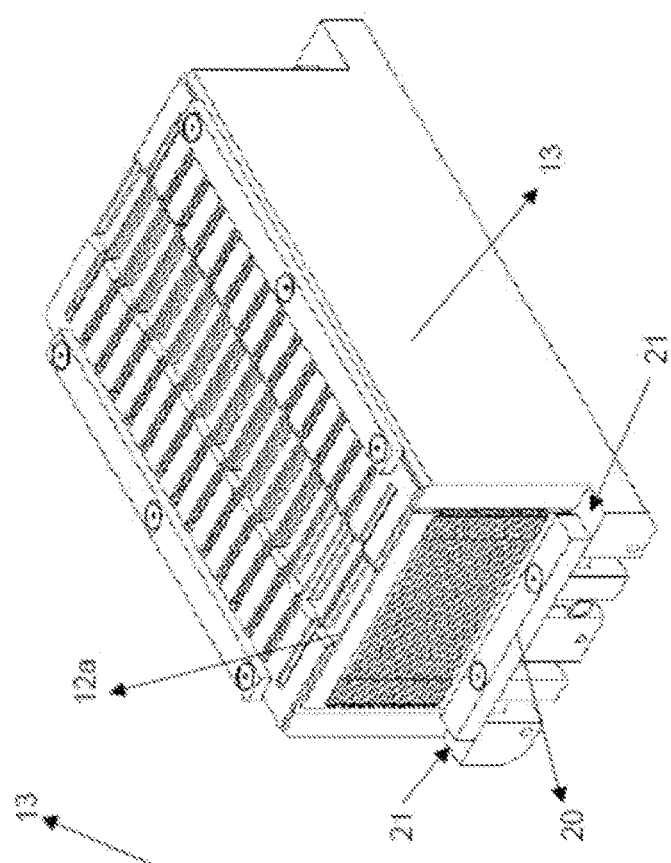

In each of FIGS. 1a, 1b, and 5b, a stop 20 is shown for the stroke limiting of the segments 12a, 12b, 12c, 12d, . . . , which is fixedly connected to the collimator frame 13 or is part thereof. A reference surface 21, on which the stop 20 will generally also be seated, is used as the starting normal for the positioning of the segments 12a, 12b, 12c, 12d, . . . .

The segmenting of the collimator assembly 10 according to the invention extends along the beam direction of the x-ray radiation. In a starting position (FIG. 3a, coarsest resolution), all segments 12a, 12b, 12c, 12d, . . . are positioned on the reference surface 21, for example, by the weight of the elements themselves or assisted by a spring. The movable stamp element 15 for deflecting multiple segments out of the reference surface 21, to which the pattern of the elements to be displaced is applied, is positioned below the segments 12a, 12b, 12c, 12d, . . . . In the starting position, the stamp element 15 is retracted (see FIG. 3a) and has no contact with the segments and thus no influence on the position of the segments. If a finer resolution is to be switched over to, the stamp element 15 is thus displaced perpendicularly to the reference surface 21 (see FIG. 3b). Multiple segments 12a, 12c, . . . are thus displaced by a deflection d with respect to the reference surface 21 by the pattern applied to the stamp element 15. With steps of different heights of the tappet 16 of the stamp element 15, individual deflections can also be implemented for the individual segments 12a, 12b, 12c, 12d, . . . . Segments 12b, 12d, . . . which are not raised by the stamp remain standing on the reference surface 21. If the deflection is selected so that the lamellae 11 of the deflected segments 12a, 12c, . . . are placed centrally between the lamellae of the non-deflected segments 12b, 12d, . . . , the angular resolution is thus improved by approximately a factor of two with respect to the starting state. If other patterns and/or deflections are selected in the stamp 15, other resolutions can also be implemented. Oblique lines of sight—as shown at the bottom of FIG. 2—can be suppressed by an asymmetrical sequence of the displaced/non-displaced segments.

Various operating positions of the displacement of the segments 12a, 12b, 12c, 12d, . . . are schematically shown in FIG. 2. The key for achieving the desired resolution of the x-ray optical system is an asymmetrical pattern in the displacement, which suppresses an obliquely extending line of sight (see in particular bottom of FIG. 2). While the collimator in the starting position shown at the top in FIG. 2 causes a coarse resolution, every second segment is displaced in the middle. However, this configuration actually does not function well, since a line of sight extending obliquely through the collimator exists, which further worsens the angular resolution. In contrast, at the bottom of FIG. 2, an operating position having asymmetry in the sequence of the displaced and non-displaced segments is shown, in which the interfering oblique lines of sight, which worsen the angular resolution, are suppressed by the collimator, so that a significantly improved resolution is achieved.

The following conditions should be met for good performance of the adjustment mechanism or actuator:

The adjustment mechanism or actuator should reproducibly displace the segments by a fraction of the lamella distance. Typical deflections are in the range of 0.1 mm-1 mm. The reproducibility is important, since otherwise the spectral resolution of the x-ray spectrometer varies from measurement to measurement.

The collimator should generally be located in a vacuum chamber, the temperature of which is stabilized. The adjustment mechanism or actuator is therefore to be suitable for vacuum and is to develop as little heat as possible.

Since the collimator has to be adjusted multiple times per measurement in a typical application, the mechanism or actuator should withstand many tens of thousands of cycles.

Since the adjustment mechanism or actuator is located in the vicinity of the beam path, it should have a compact structure.

The adjustment mechanism or actuator is implemented in the embodiments of the invention shown in FIGS. 4a to 5a via a flexible hose 14' below the movable stamp 15, which in the starting position is in pressure equilibrium with the surroundings or has a lower internal pressure than the surroundings. The intrinsic weight of the segments and possibly an additional spring compress the hose and press all segments 12a, 12b, 12c, 12d, . . . onto the reference surface 21. If the movable stamp 15 is to be deflected, an overpressure is applied to the hose and it inflates slightly. This moves the stamp 15 and deflects the set segments. The amplitude of the stamp movement is limited by the stop 20—as can be seen well in FIG. 1b—so that the positioning takes place reproducibly and precisely.

Advantages of the pneumatic adjustment mechanism or actuator include no heat development in the vicinity of the beam path. In addition, a drive via valves, flexible hoses permits deliberate placement of the drive at any point in the device; no mechanical coupling via a belt drive or the like required as in conventional adjustment via motor.

Figure 4B:
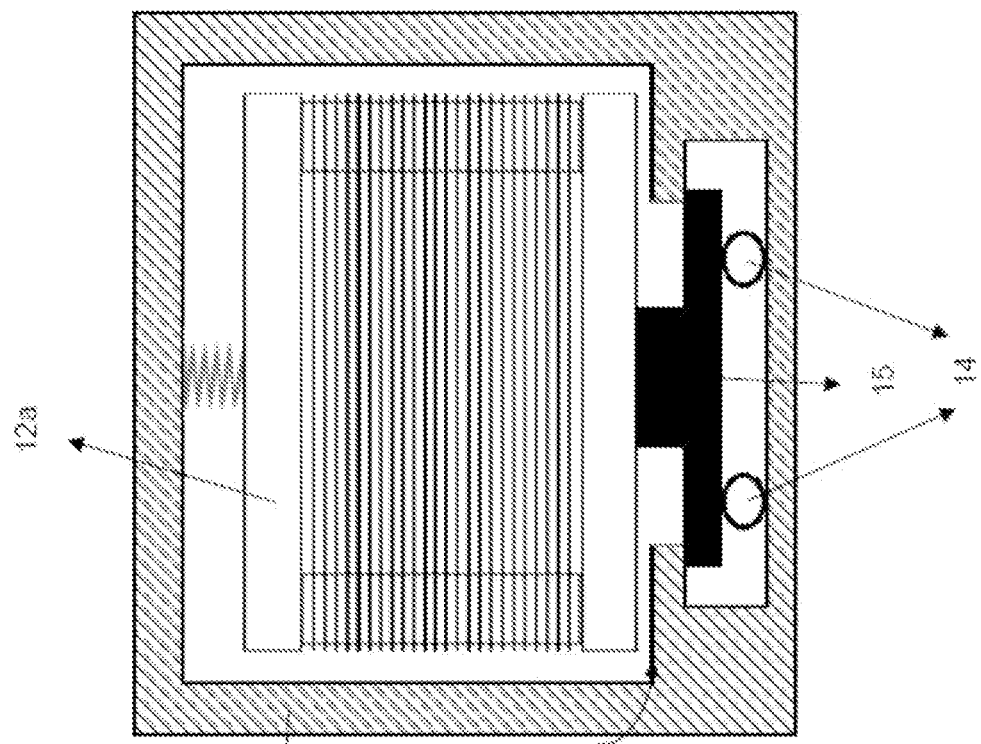
FIG. 4b shows an embodiment like FIG. 4a, but in an operating position having displaced segments.
Figure 4A:
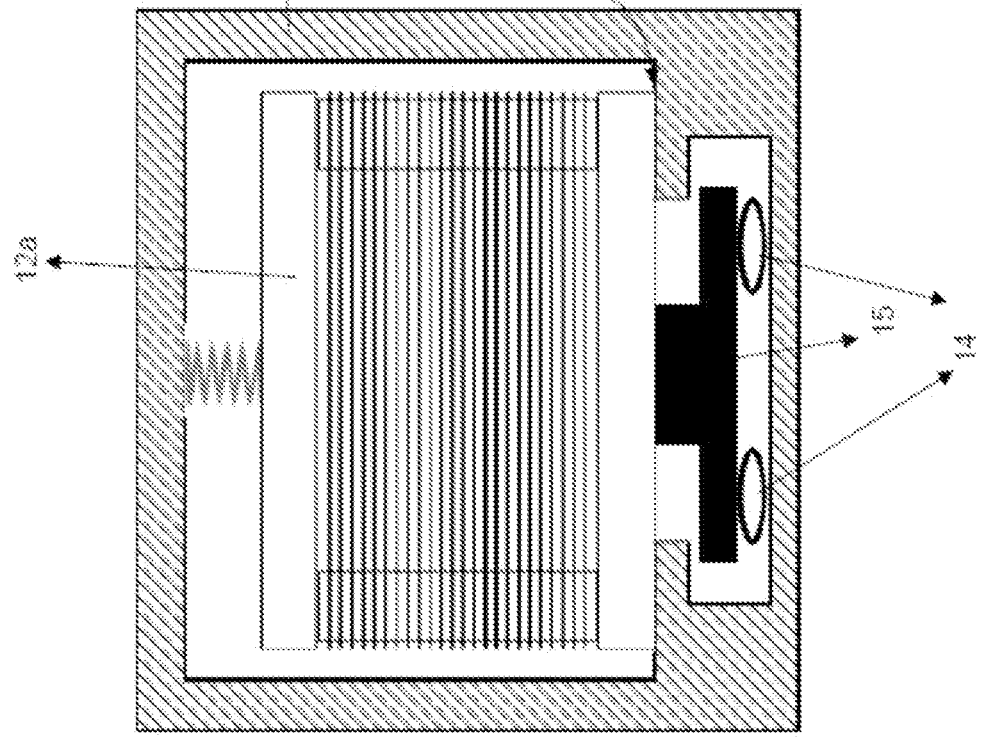
FIG. 4a shows a schematic vertical section through an embodiment of the collimator assembly according to the invention in a frontal view in the direction of the z axis in non-displaced starting position of the segments.

FIG. 4a shows a frontal view in the direction of the z axis of an embodiment of the collimator assembly according to the invention in the non-displaced starting position of the segments and with "flat" hose 14' of the pneumatic actuator (ambient pressure prevails in the interior of the hose 14'). The stamp 15 is deactivated and the segments—only the frontal first segment 12a can be seen here, of course—rest on the reference surface 21 of the collimator frame 13.

In FIG. 4b, in contrast, the central stamp 15 is activated by means of the "stuffed full" (inflated with overpressure) hose 14' and the segments—again represented by the frontal first segment 12a—are located in a deflected operating position having improved angular resolution of the collimator assembly 10.

Figure 5A:
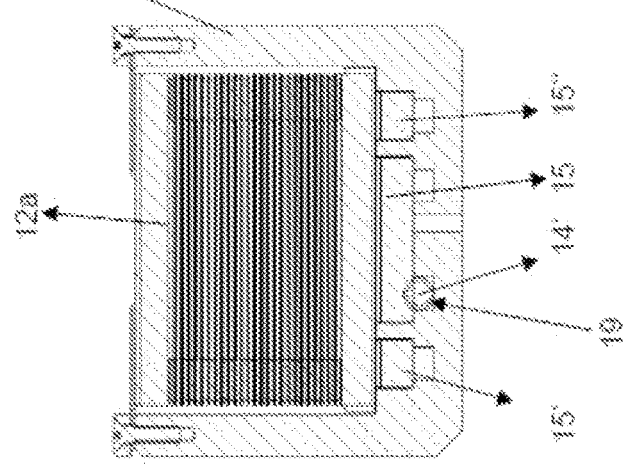
FIG. 5a shows a schematic vertical section through an embodiment of the collimator assembly according to the invention in a frontal view in the direction of the z axis having one central and two flanking outer stamps.

FIG. 5a shows an embodiment of the collimator assembly according to the invention having one central stamp 15 and two flanking outer stamps 15', 15" having other patterns (not recognizable in the drawing) for further settable angular resolutions. An activation of at least the central stamp 15 by inflating the hose 14' of a pneumatic activator is also indicated here, wherein the hose 14' is inserted in a receptacle recess 19 of the collimator frame 13.

Finally, FIG. 5c shows an embodiment of the collimator frame 13 for mounting the segmented collimator assembly 10 according to the invention having milled recesses for two hoses of the actuator—not shown here—having a pneumatic adjustment mechanism.

Since the beam path is normally evacuated in an x-ray spectrometer, only one 3-way valve per angular position is required for the drive. The flexible hose can be connected to the vacuum chamber via the valve (not separately shown in the drawing) in the starting position in order to establish a pressure equilibrium. To move the stamp, the hose can then simply be aerated via the valve (corresponds to approximately 1 bar overpressure).

The invention claimed is:

1. A collimator assembly for an x-ray optical system comprising:
   a Soller slit for collimating x-ray radiation with respect to a direction of an axis (z) of the Soller slit, wherein the Soller slit has a plurality of lamellae spaced apart from one another having lamella planes parallel to one another, and wherein the Soller slit comprises a plurality of segments arranged along the axis (z) and separated from one another; and
   a collimator frame for enclosing and guiding the plurality of segments, wherein at least one of the plurality of segments is displaceable with respect to the collimator frame and relative to other segments of the plurality of segments.

2. The collimator assembly as claimed in claim 1, wherein the plurality of segments comprises at least three segments, wherein at least one of the plurality of segments is displaceably arranged along its segment direction, perpendicular to a lamella plane relative to the collimator frame.

3. The collimator assembly as claimed in claim 2, wherein segment directions of all segments of the plurality of segments are oriented identically, or segment directions of some segments of the plurality of segments are arranged rotated by 90° with respect to segment directions of other segments.

4. The collimator assembly as claimed in claim 2, wherein each of the plurality of segments has same external dimensions in a segment direction.

5. The collimator assembly as claimed in claim 1, wherein each of the plurality of segments has same external dimensions in the direction of the axis (z) of the Soller slit.

6. The collimator assembly as claimed in claim 1, wherein each of the plurality of lamellae has a same spacing from one another in each segment of the plurality of segments.

7. The collimator assembly as claimed in claim 1, further comprising actuators, wherein segments of the plurality of segments that are displaceable are coupled to the actuators, which can effectuate a displacement of the segments of the plurality of segments that are displaceable.

8. A collimator assembly for an x-ray optical system comprising:
   a Soller slit for collimating x-ray radiation with respect to a direction of an axis (z) of the Soller slit, wherein the Soller slit has a plurality of lamellae spaced apart from one another having lamella planes parallel to one another, and wherein the Soller slit comprises a plurality of segments arranged along the axis (z) and separated from one another; and
   a collimator frame for enclosing and guiding the plurality of segments, wherein at least one of the plurality of segments is displaceable with respect to the collimator frame and relative to other segments of the plurality of segments, and wherein each displaceable segment of the plurality of segments is spring mounted along a segment direction perpendicular to a lamella plane relative to the collimator frame.

9. The collimator assembly as claimed in claim 8, wherein each spring-mounted segment of the plurality of segments is arranged in a base position in such a way that it is pressed with its respective segment base against the collimator frame.

10. The collimator assembly as claimed in claim 9, further comprising at least one stamp element having at least one tappet, which can contact a segment base of one or more displaceable segments of the plurality of segments through an opening of the collimator frame, and can displace the one or more displaceable segments of the plurality of segments out of the base position into a set position such that a predefined set pattern of the plurality of segments is achieved.

11. The collimator assembly as claimed in claim 10, wherein each stamp element of the at least one stamp element has a collar that can strike against an edge of the opening of the collimator frame for an accurate positioning of the plurality of segments in the set position.

12. The collimator assembly as claimed in claim 10, wherein each stamp element of the at least one stamp element comprises multiple tappets, and the multiple tappets have various heights in the segment direction for different positioning of the one or more displaceable segments.

13. The collimator assembly as claimed in claim 10, wherein the at least one stamp element comprises multiple stamp elements that can be moved independently of one another such that different set patterns of the plurality of segments can be achieved with an introduction of the multiple stamp elements into a contact pressure position.

14. The collimator assembly as claimed in claim 10, further comprising a flexible hose and a receptacle in the collimator frame below the at least one stamp element for the flexible hose, which can expand due to an application of a gas pressure and can displace the at least one stamp element from the base position into the set position.

15. The collimator assembly as claimed in claim 10, wherein adjacent segments of the plurality of segments, which are displaceable by a stamp element of the at least one stamp element jointly by an equal distance d, or are made non-displaceable, are each combined into a segment group.

* * * * *